(12) United States Patent
Kahle et al.

(10) Patent No.: US 7,153,033 B2
(45) Date of Patent: Dec. 26, 2006

(54) COUPLING DEVICE FOR GLASS FIBER CONNECTORS

(75) Inventors: Eberhard Kahle, Berlin (DE); Adrian Benedetto, Berlin (DE); Jorg Adomeit, Berlin (DE); Joachim Brunzel, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 11/176,522

(22) Filed: Jul. 6, 2005

(65) Prior Publication Data

US 2005/0244107 A1 Nov. 3, 2005

Related U.S. Application Data

(63) Continuation of application No. 10/381,614, filed as application No. PCT/EP01/10934 on Sep. 21, 2001, now Pat. No. 6,932,513.

(30) Foreign Application Priority Data

| Sep. 26, 2000 | (DE) | ................................ 100 47 898 |
| Aug. 11, 2001 | (DE) | ................................ 101 39 670 |

(51) Int. Cl.
*G02B 6/38* (2006.01)

(52) U.S. Cl. ....................................................... 385/55

(58) Field of Classification Search ................. 385/53, 385/55, 56, 71, 72, 77, 78
See application file for complete search history.

(56) References Cited

U.S. PATENT DOCUMENTS

| 4,418,983 | A | | 12/1983 | Bowen et al. | |
| 4,986,779 | A | * | 1/1991 | Ferrill et al. | ................. 439/108 |
| 5,214,735 | A | | 5/1993 | Henneberger et al. | ...... 385/136 |
| 5,528,711 | A | * | 6/1996 | Iwano et al. | ................... 385/56 |
| 5,673,346 | A | * | 9/1997 | Iwano et al. | ................... 385/60 |
| 6,208,796 | B1 | | 3/2001 | Williams Vigliaturo | ..... 385/135 |
| 6,307,998 | B1 | | 10/2001 | Williams Vigliaturo | ..... 385/134 |
| 6,478,472 | B1 | * | 11/2002 | Anderson et al. | ............. 385/53 |
| 6,485,189 | B1 | * | 11/2002 | Gilliland et al. | ............... 385/59 |
| 6,506,081 | B1 | * | 1/2003 | Blanchfield et al. | ......... 439/682 |
| 6,547,450 | B1 | * | 4/2003 | Lampert | ....................... 385/78 |
| 2002/0012503 | A1 | | 1/2002 | Kuhne | |

FOREIGN PATENT DOCUMENTS

| DE | G 9203019 | 6/1992 |
| DE | 198 53 982 A1 | 6/1999 |
| DE | 199 05 240 A1 | 8/2000 |
| EP | 0 560 230 A1 | 9/1993 |
| EP | 0 730 177 A2 | 9/1996 |
| JP | 58-129409 | 8/1983 |
| JP | 7-318758 | 12/1995 |
| JP | 8-122570 | 5/1996 |

* cited by examiner

*Primary Examiner*—Chandrika Prasad
(74) *Attorney, Agent, or Firm*—Merchant & Gould P.C.

(57) ABSTRACT

A coupling device for glass fiber connectors has a front panel (2,4) and at least on coupling (1,1',1",201,207), which can be inserted into the front panel from the front face (20,40, 202) and can be locked by means of latching springs (14,14',14",214). The latching springs engage behind the front panel (2,4). The coupling (1,1',1",201,207) can be released from the front face and, in addition to plug openings (21,41) for the couplings, the front panel (2,4) for this purpose also has openings (22,23,23',42,47,45,46) for releasing the couplings from the front face.

24 Claims, 10 Drawing Sheets

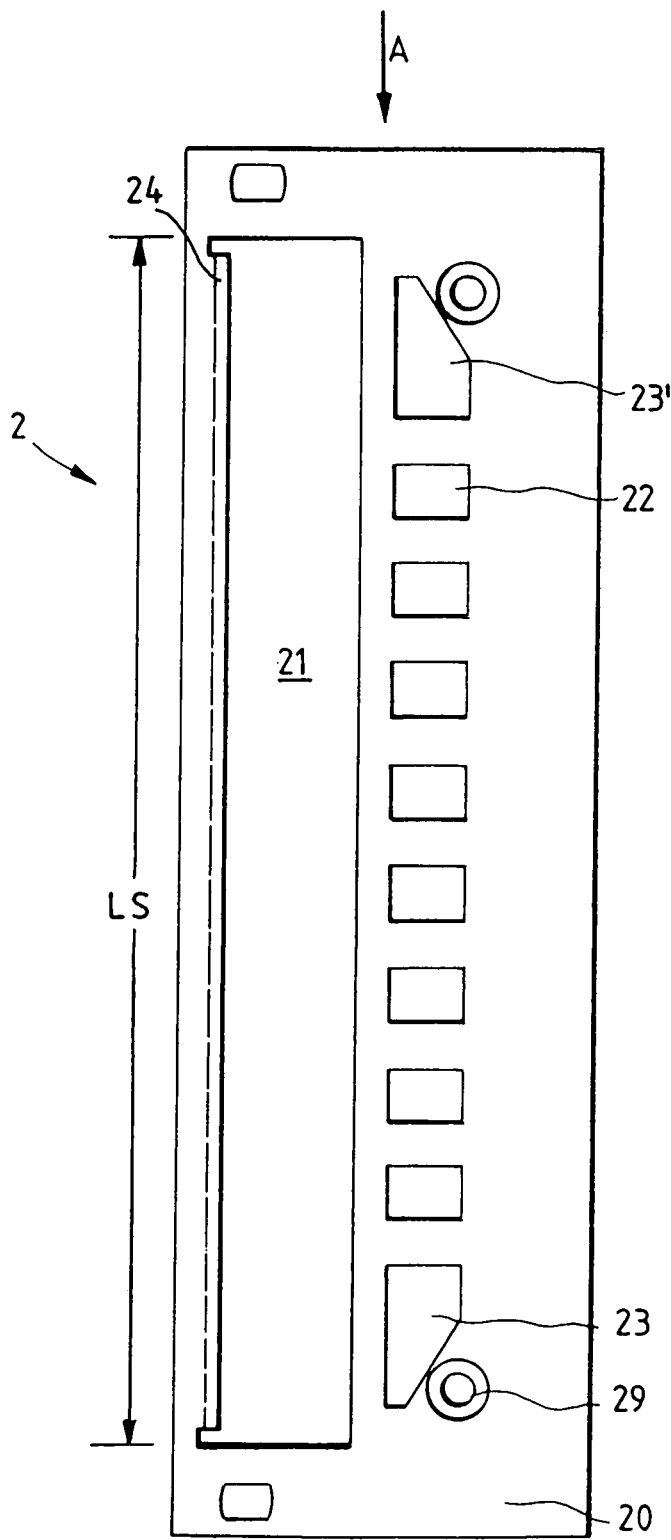

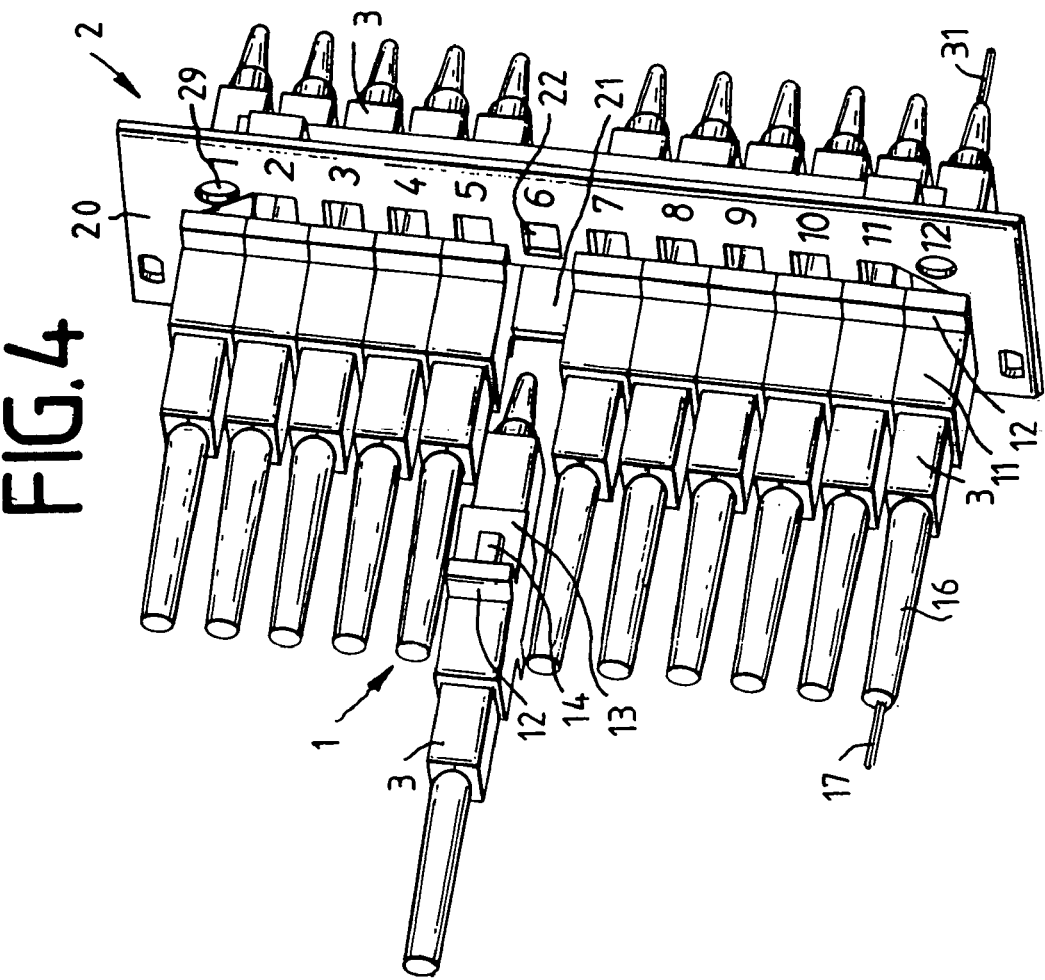
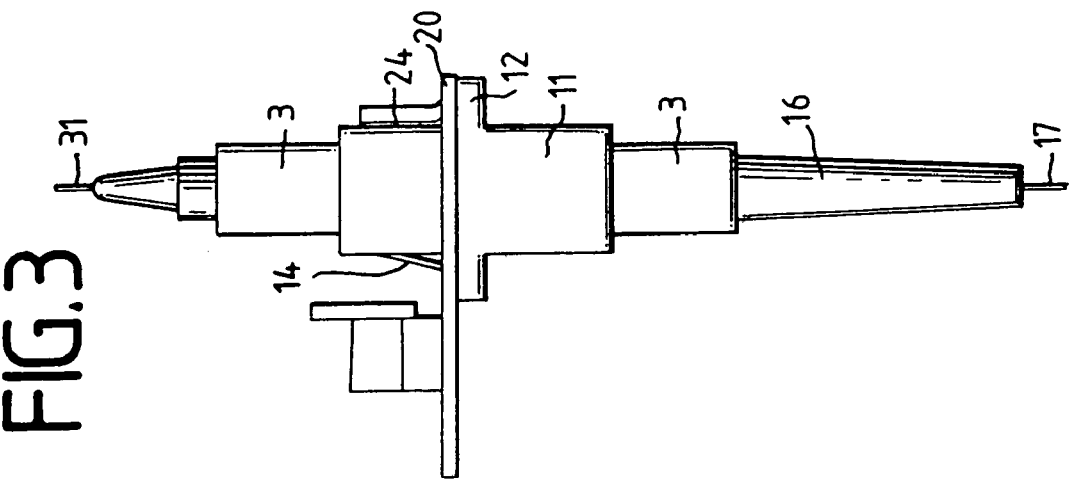

Section B-B

COUPLING DEVICE FOR GLASS FIBER CONNECTORS

CROSS REFERENCE TO RELATED APPLICATIONS

This application is a continuation of U.S. application Ser. No. 10/381,614, filed Mar. 26, 2003, now U.S. Pat. No. 6,932,513 which is the National Stage of International Application No. PCT/EP01/10934, filed Sep. 21, 2001, the disclosures of which are incorporated herein by reference in their entirety.

FIELD OF THE INVENTION

The invention relates to a coupling device for glass fiber connectors having a front panel, and to couplings which can be inserted into the front panel from the front face.

BACKGROUND OF THE INVENTION

Plug connectors and glass fiber connectors are known, inter alia, from EP 0 590 586 A1 or from U.S. Pat. No. 5,317,663. This coupling for glass fiber connectors can be inserted into a front panel from the front face, and also discloses a coupling which can be locked by means of latching springs which engage behind the front panel. The coupling for glass fiber connectors comprises a housing with two ends, which are in the form of front and rear plug holders, for holding plugs, as well as flanges which project from the housing, suitable for making contact with the front panel and for locking the coupling there with at least one latching spring which is arranged on the coupling in order to engage behind the front panel. A latching spring such as this has two spring tabs on opposite sides of the rear plug holder. The latching springs are in the form of leaf springs which engage through a corresponding aperture in the front panel and thus lock the coupling in the front panel. For this purpose, the leaf spring or spring tongue can be pressed to such an extent against the coupling housing that the leaf spring or the spring tab passes through the front panel in the pushed-in state, and then spreads. The use of a coupling or coupling device such as this is dependant on the front panel having appropriate apertures, and the front panel must be provided by means of an appropriate configuration with a specific aperture in order to lock couplings there; the coupling must be released from the rear face of the front panel.

In addition, plug connectors having latching devices which can be released from the front face of a housing or of a front panel and which project from the front panel are known from telephone technology and from local area networks (EP 0 766 350 A2). In this case, inadvertent release is possible, and a relatively large amount of space is required to manually grip the latching device.

SUMMARY OF THE INVENTION

The invention is thus based on the problem of making it possible to simplify the production of such coupling devices and/or allowing couplings for glass fiber connectors to be mounted at the front.

According to the invention, a coupling device for glass fiber connectors has a front panel and couplings, which can be inserted into the front panel and can be released from the front face, and couplings which can be locked by means of latching springs in the front panel, with the front panel also having openings for releasing the couplings on its front face, in addition to plug openings for the couplings.

A front panel for a series of couplings which are to be arranged alongside one another has, for example, an opening which corresponds to the accumulated coupling widths.

Each of the inserted couplings has a flange for making contact in front of the front panel and, in a first embodiment, has a latching spring on the coupling surface, in order to engage behind the front panel. In addition to the plug opening, each coupling space has a further associated opening, into which a tool can be inserted through the front panel, by means of which the latching spring is compressed, thus unlocking the coupling and allowing it to be released from the front panel.

In a second variant, an integral latching spring has two spring tabs on opposite sides of a coupling.

The front panel which is used for this purpose likewise has an elongated opening for the insertion and locking of a large number of couplings which are arranged in a row, with each spring tab having an associated spring groove as an extension of the plug opening, although at least one of the locked couplings—generally at one end of the plug opening—has, instead of a latching spring, a screw connection, which can be released from the front face, to the front panel. When the couplings are installed, the spring grooves are located alongside the spring tabs, which are in turn seated behind a latching tab. This makes it possible, once a coupling has been released, for other couplings to be withdrawn and released individually, or all of them successively, after pushing them to the side with their latching tabs through the spring grooves.

In a further embodiment, a part of the latching spring projects through the flange to the front face and can then be compressed in a similar way to a latching clip according to the prior art, and the coupling can then be withdrawn with the spring tab unlocked.

A further solution for couplings of this generic type is distinguished by the latching spring being composed of two side pieces which are adjacent to two side surfaces of the coupling, and by these side pieces having catches which can hook behind or in the front panel. These two side pieces of the latching spring are connected by means of a pressure plate, which clasps the third side surface of the coupling. The pressure plate is supported by means of a spring leg on the coupling, in which case this spring leg may be an integrally projecting element of the pressure plate itself or may be an additionally fitted element under the pressure plate where it provides sprung support relative to one housing face of the coupling.

The side pieces themselves may advantageously be provided with a notch or a clasp, which is supported behind a step on the flange and can be positioned there, so that, when pressure is exerted on the pressure plate, although the distance between the side pieces and the flange can be changed, the side pieces are still adjacent to the side surfaces, but their position is slightly shifted with respect to the third side surface, to which the pressure plate and the spring leg are fitted. If the side pieces are located within the contour of the coupling, only an aperture without any further steps need be incorporated in the front panel, thus allowing the coupling housing to pass. A simple rectangular or square stamped area in the front panel is thus sufficient to install the plug together with the coupling and its latching spring and to lock them in the front panel. During the locking process, the pressure plate is compressed against the force of the spring leg, and the coupling part, or to be more precise the coupling housing, is then pushed together with the latching spring into the recess in the front panel, and the load is then removed from the pressure plate so that corresponding latching tabs on the side pieces can engage behind the front panel. This results in an interlocking connection, and the coupling can also be removed again individually.

In one exemplary embodiment, the catch on the side piece forms the end of the notch which is then, of course, at least as long as the flange and the front panel are thick.

According to one development, the step on the flange also occupies virtually the entire side area of the coupling between the flange or, in the case of a double-sided arrangement and flanges, between both flanges and the front and rear plug holder openings. In other words, the entire side surface of the coupling housing snaps back between the plug holder openings, thus offering sufficient space for the adjacent side pieces of the spring.

For the sake of simplicity, for example, in the case of a coupling housing of rectangular cross section, a flange which in each case has a latching spring is arranged on each of the two narrow faces of the coupling, which latching springs can be pressed together in opposite directions and after passing through the front panel, are automatically relieved of the load owing to the effect of the spring legs under the pressure plate, once a force is not longer applied to the pressure plate. As is known per se, the latching spring may be composed of metal, plastic or coated metal, as those skilled in the art will be aware from the prior art.

A latching spring formed in this way may also be used in the same simple manner for duplex plugs.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

FIG. 1 is a first embodiment of a front panel for couplings;

FIG. 2 is a side view of the front panel shown in FIG. 1;

FIG. 3 is a side view of a coupling device with a front panel, with a first embodiment of a sprung lock;

FIG. 4 is a perspective plan view of a first front panel shown in FIG. 1 with a coupling;

FIG. 6 is a second embodiment of a front panel for a coupling as shown in FIG. 5a;

FIG. 9b is a section B—B through FIG. 9a;

DESCRIPTION OF THE PREFERRED EMBODIMENTS

Figure 5A:
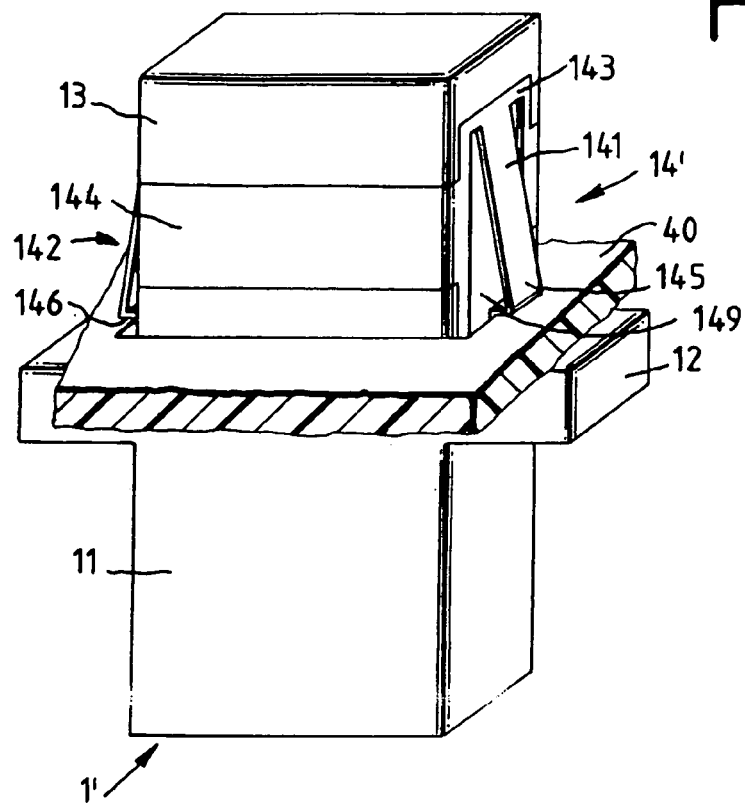
FIG. 5a is a second embodiment of a sprung lock for the coupling in the front panel.

Referring to the drawings in particular, identical reference symbols are used for identical or equivalent parts in the following text.

FIG. 3 shows a first form of the lock for the coupling 1. Glass fiber cables 17 have kink protection 16, which is held by a plug 3. The coupling is provided with plug holders 11, 13 at both ends of a housing, to the front and rear of the front panel. A flange 12 of the coupling 1 rests on the front face of the front panel 2, while one side of the coupling is supported on the guide 24 and the other side is locked by means of a latching spring 14 behind the front panel 2. Glass fiber cables 31 are combined in the same way in a plug 3, whose configuration is complementary to that of the coupling halves 11 and 13, and can be inserted into them, so that the glass fiber connection is produced behind the front panel 2.

FIGS. 1–4 show a first embodiment of a front panel 2, whose form can be seen from the view A shown in FIG. 2, for a plug housing that is not illustrated. The front 20, which can be fixed on a housing by means of screws through openings 29, has an elongated opening 21 with a width LS for a large number of couplings. However, couplings may also have individual plug-in spaces with correspondingly smaller openings. The side view A shown in FIG. 2 shows the guide 24. A tool, for example a screwdriver, can be inserted through openings 22, 23, 23', and can then be used to compress the spring tab. The coupling can then be withdrawn. FIG. 4 shows the removal situation in which a coupling has been released and has been withdrawn through the plug opening 21 to the front face; in this position, the coupling and/or the plugs on the glass fiber cables 17, 31 can be uncoupled.

Figure 5B:
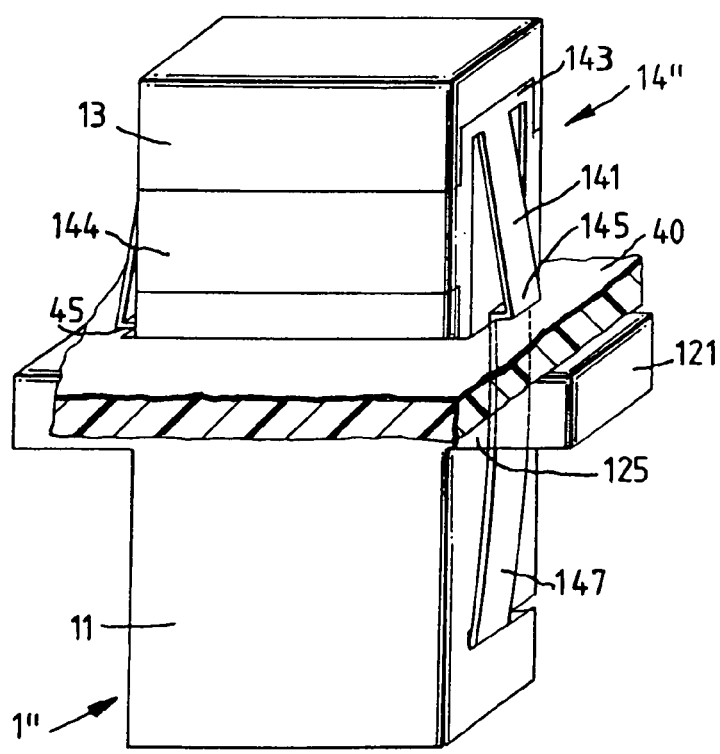
FIG. 5b is a third embodiment of a sprung lock for the coupling in the front panel.

FIGS. 5a and 5b show, in a highly enlarged manner, schematic details of the locking of the couplings 1', 1" to the housing and its front plug holder 11, the flange 12 and rear plug holder 13 through a latching spring 14' or 14" in the front panel 40, which is composed of plastic. This springs 145, 146, analogously to FIG. 5a, are known per se from the prior art, although springs with a chamfered tab are preferably used for the invention.

The latching springs 14' in FIG. 5a differ only by having the spring clip 147 as shown in FIG. 5b, which is passed through a flange groove 125 in the flange 121 or groove 45 in the front 40, thus allowing the spring tab 145 to be unlocked from the front 40 from the face, when the spring clip is pressed in the direction of the plug holder 11.

In principle, the latching spring 14', 14" is composed integrally of a metal plate with a spring frame 143 in which the spring tongue 141 or 142 is located. The two spring tongues 141, 142 on the sides of the coupling 1' can be fitted as a unit to the plug holder 13 through the spring connector 144, and are fixed there in a depression on the surface, the spring bearing 149, for example by adhesive bonding or clamping.

Figure 6:
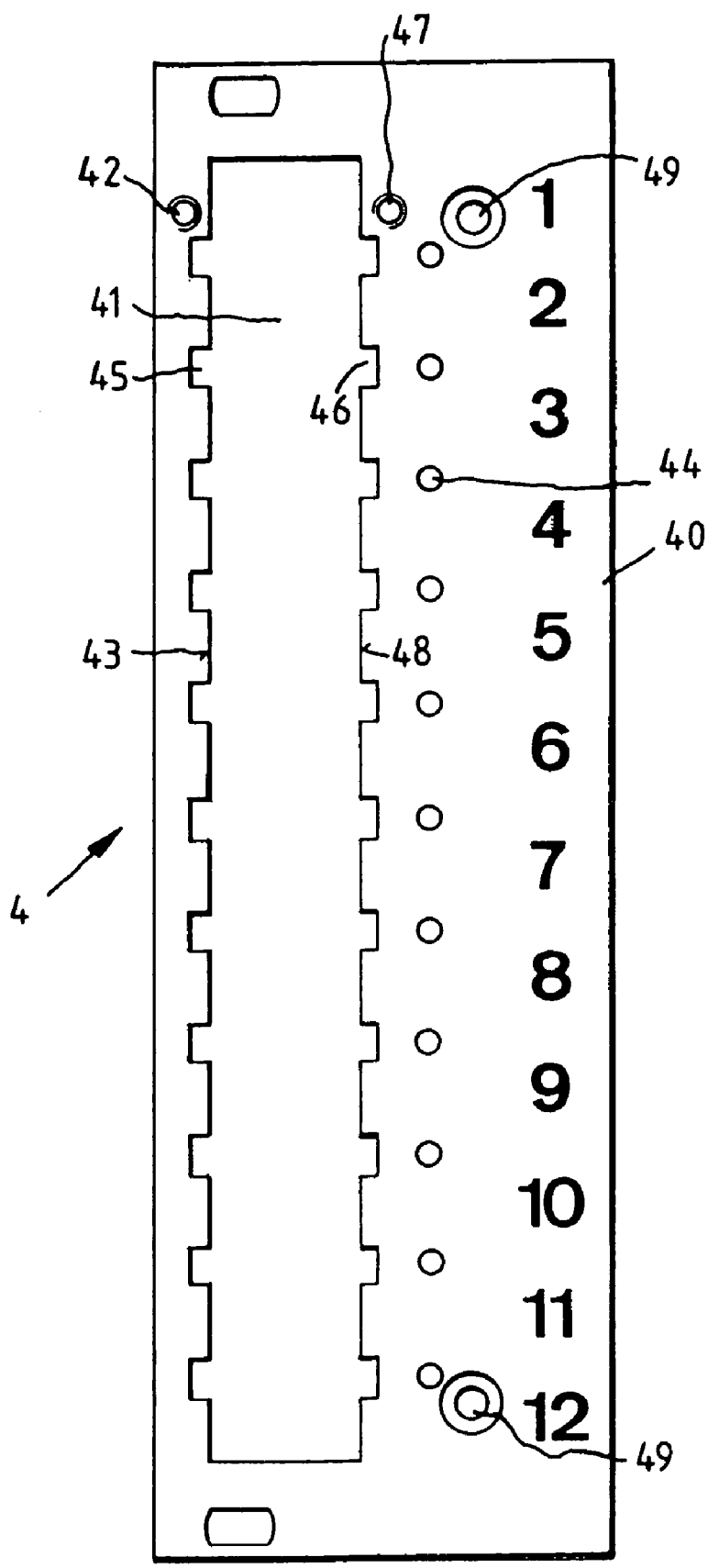
Figure 7:
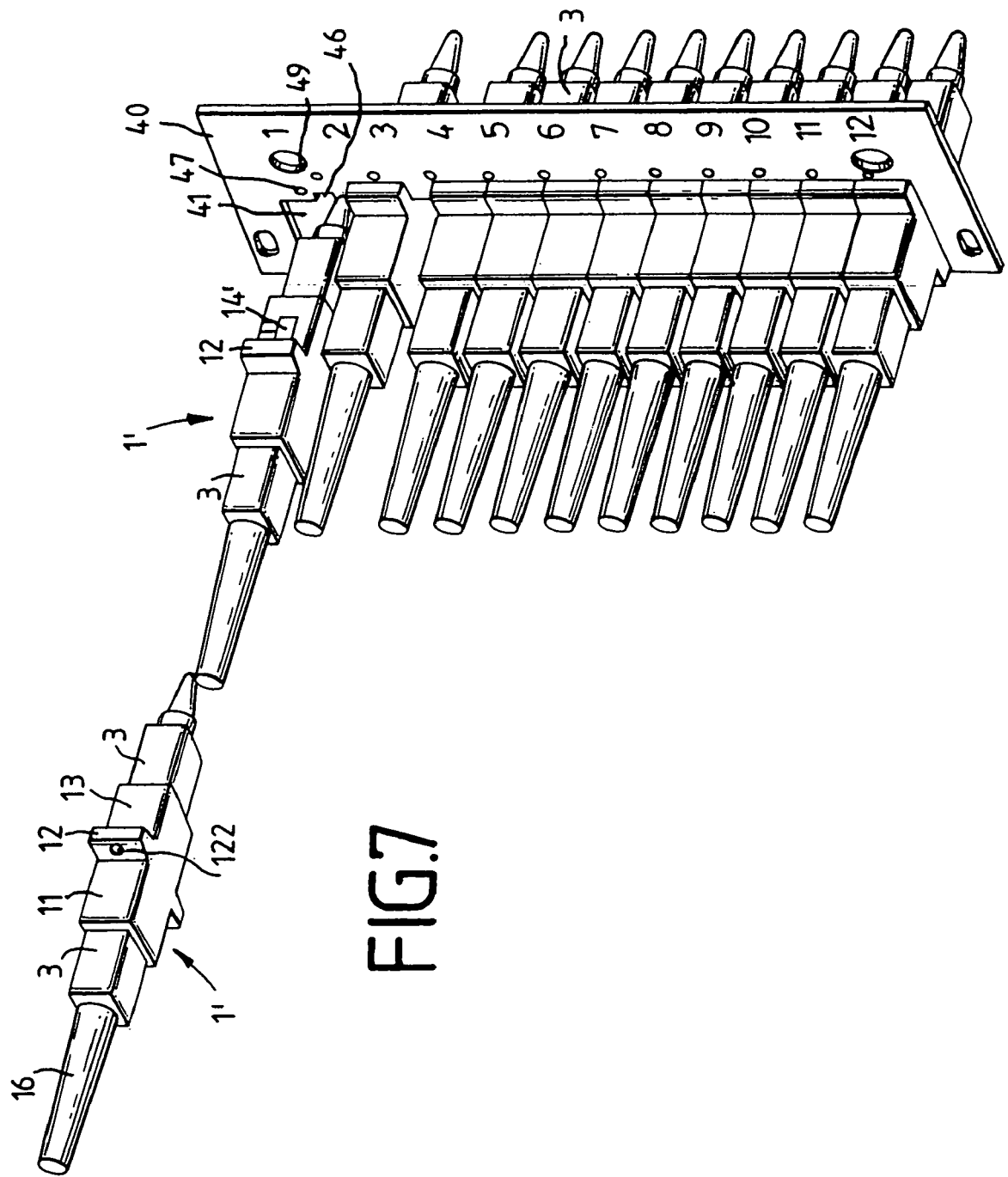
FIG. 7 is a perspective plan view of a front panel as shown in FIG. 6 with couplings in the installation situation.
Figure 8:
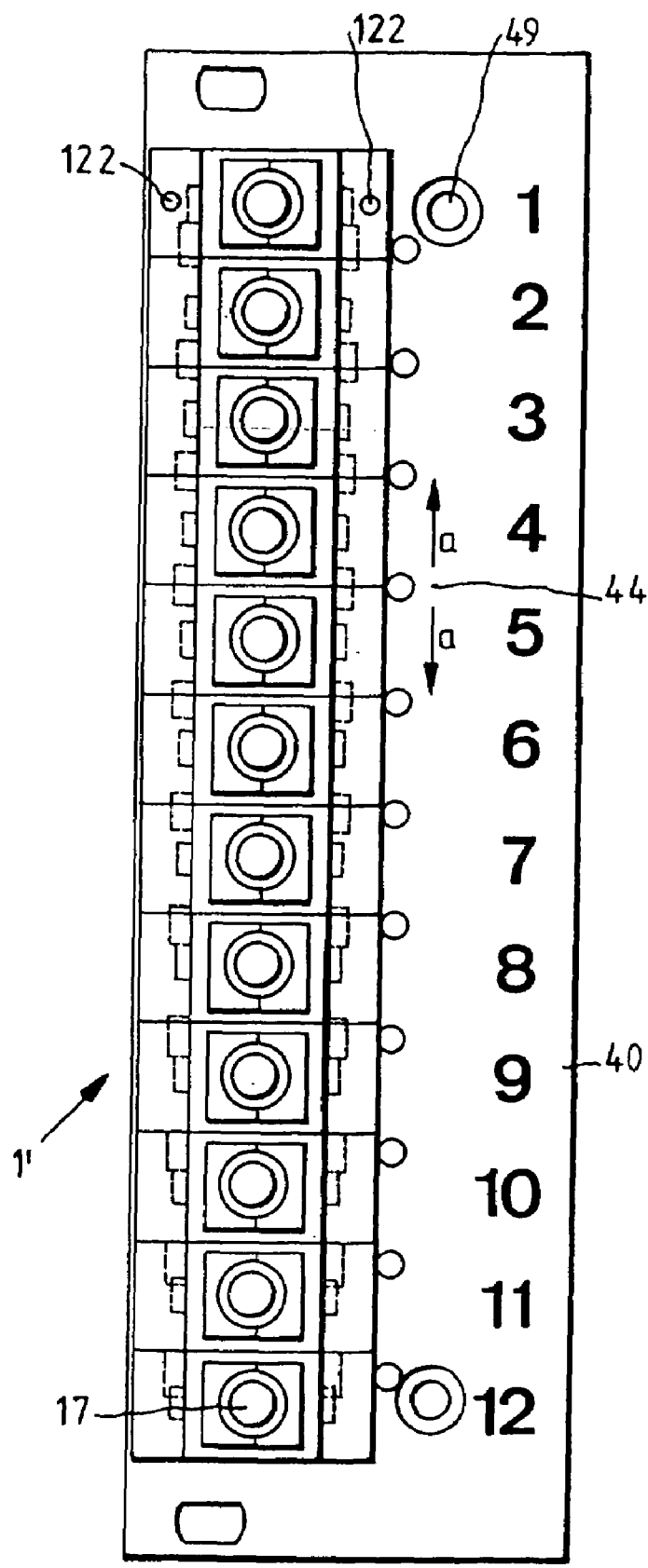
FIG. 8 is a plan view of a completely installed arrangement as shown in FIG. 7.

Latching springs such as these are used in a further embodiment of the invention as shown in FIGS. 6–8. The front 40 is screwed through openings 49 to a housing that is not illustrated. A front panel 4 with a front 40 has a plug opening 41 for 12 couplings (FIGS. 7, 8) with 11 spring grooves 45, 46 for unlocking the couplings with latching springs 14, interrupted by latching tabs 43, 48, behind which the spring tabs 145, 146 are hooked. The position of the spring grooves is indicated by positioning marks 44. The distance between the spring grooves 45, 46 and the associated positioning marks 44 diverges with respect to one another. The distance as shown in FIG. 8 in the exemplary embodiment is greater than the width of the couplings. This means that the couplings cannot all fall out of the plug opening at the same time after releasing a first coupling, but can be removed individually from a spring groove only after deliberately shifting each coupling to the side. The last coupling, or one coupling, cannot be inserted by means of spring grooves; this is fixed by means of screws (not shown) in threaded holes 42, 47. The other couplings can be moved behind the spring tabs 43, 48 once they have been inserted in the area of the spring groove. However, if the plug opening size has appropriate tolerances, the couplings can at the same time be pressed against the pressure of the latching spring onto the correct plug space behind the latching tab of the plug opening. In a corresponding way, when releasing a coupling 1' as shown in FIG. 7—where the plug spaces are numbered 1–12 on the front 40—the screws (which are not illustrated) which fix the flange 12 in the flange holes 122 and in the threaded holes 42, 47 are first of all released from the front 40. The first coupling 1' is then withdrawn, and the next coupling is moved as far as a spring groove 45, 46 and is withdrawn. All the couplings, or else only individual couplings, can be withdrawn successively or, conversely, can be installed successively again.

All the couplings 1' are equipped in the same way, that is to say the first coupling also has a latching spring 14' as shown in FIG. 5a. However, this integral spring is removed if there is only one coupling, and for the first coupling. FIG. 8 shows a plan view of the complete installed situation.

Figure 9A:
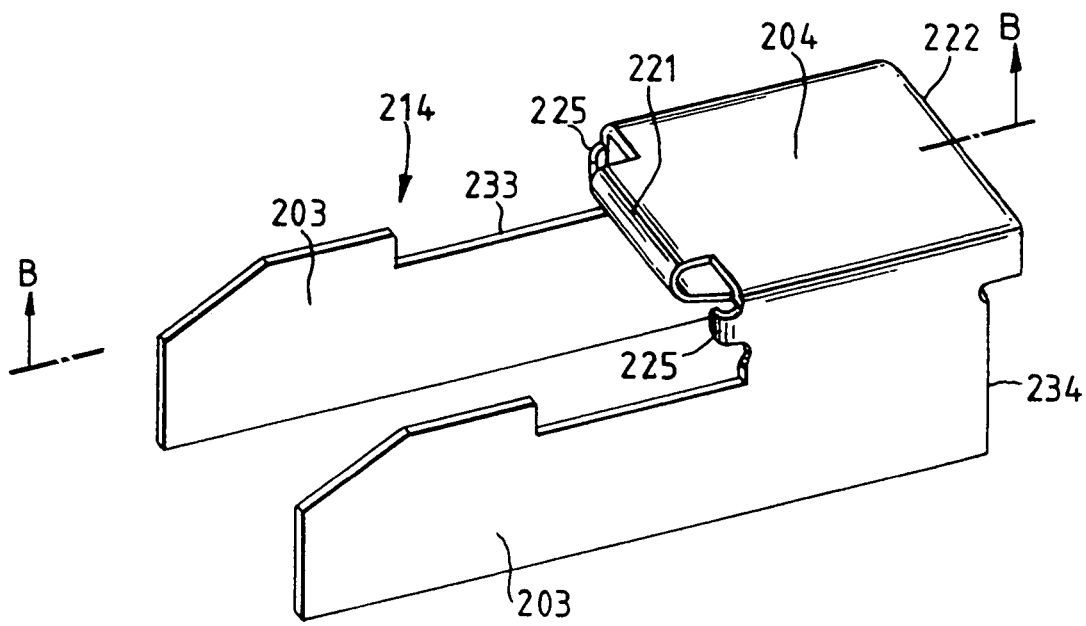
FIG. 9a is a perspective plan view of a latching spring according to the invention.

FIG. 9a shows a perspective plan view of the latching spring 214 according to the invention, based on the further solution and as an alternative to the structure shown in FIG. 5b or a coupling, essentially comprising two side pieces 203 and a pressure plate 204 which connects the side pieces 203.

Figure 9B:
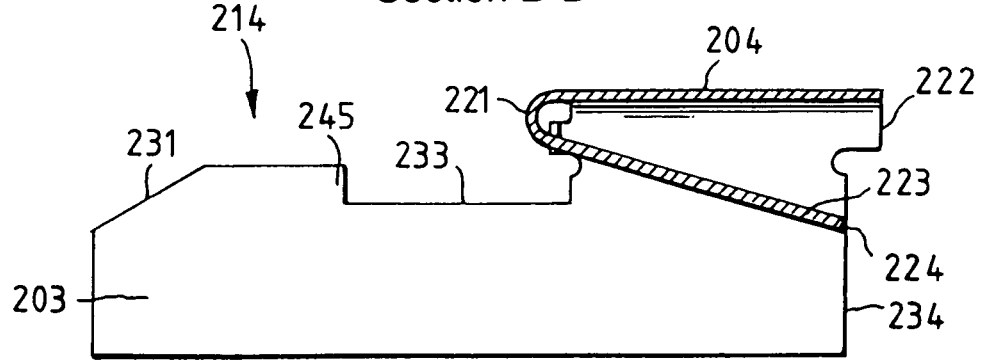

FIG. 9b shows the section B—B through the latching spring as indicated in FIG. 9a, with the pressure plate 204 having an integral component a spring leg 223 which extends under the pressure plate 204 commencing at the front plate start 221 of the pressure plate 204, and which can be supported by a support 224 on the coupling, which is not illustrated, and/or on the upper face of the coupling housing. It is obvious that this spring leg 223 can bend further in the direction of the pressure plate 204 when it is supported on the support 224 on the housing and corresponding vertical pressure is applied to the pressure plate 204. The side piece 203 has a chamfer 231 in order to make it easier to push the spring 214 through the recess 261 in the front panel 202. The spring tab 245 of the side piece 203 comes to rest behind the front panel 202. The clasp 233 is used for fixing the latching spring 214 behind the flange of the coupling, which is not illustrated, as is evident in particular from FIG. 12. The rear plate end 222 and the bent lugs 225 as well as the side piece end 234 are used for supporting the latching spring and to secure its position on the plug holder 221 (FIGS. 10 to 12).

Figure 10:
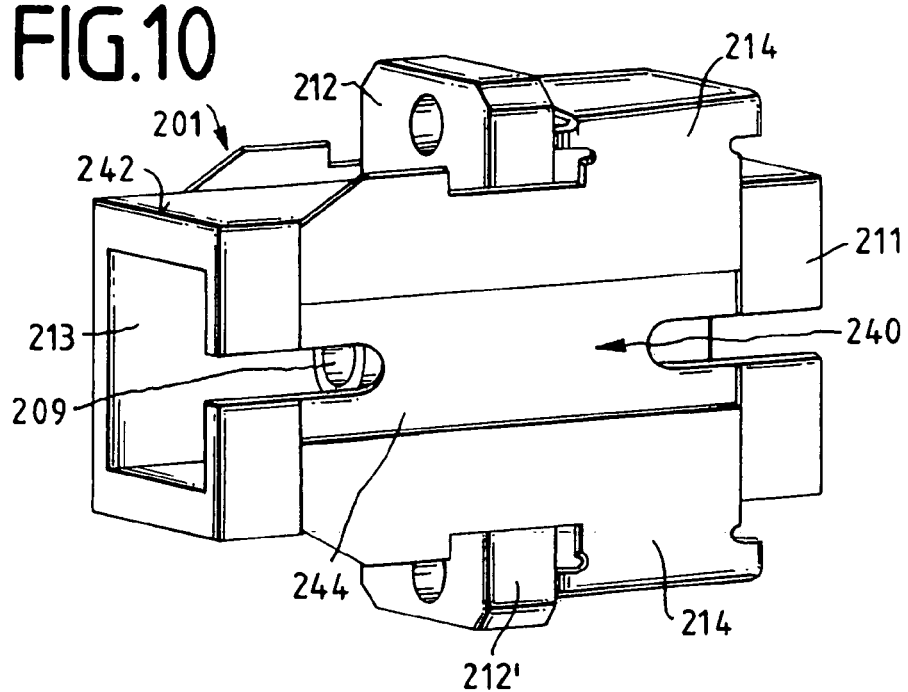
FIG. 10 is a perspective view of a simplex coupling with latching springs as shown in FIGS. 9a, b installed.

FIG. 10 shows a simplex coupling 201 with a flange 212 or 212' on the narrow faces (i.e., minor surfaces) 242, of the coupling 201 which has a rectangular cross section. A rear plug holder 213 and a front plug holder 211 are used for the insertion of plug connectors, in order to make an operative connection with the plug pin centering sleeve 209. The latching spring 214 is seated behind the flanges 212, 212' and is supported by the spring leg, which cannot be seen here, on the narrow face 242 of the coupling housing of the simplex coupling 201, with the side pieces 203 being adjacent in steps (i.e., recessed areas) 244, which at the same time form side surfaces of the simplex coupling 201, and hence disappearing within the contours of the plug holder 213, 211, which form the largest cross section (see FIG. 13), so that the side surfaces of the plug holders 213, 211 and the surface of the side piece 203, which are located close together on the side surface (i.e., major surface) 240, form a common surface relative to the front panel 202 (FIG. 12).

Figure 11:
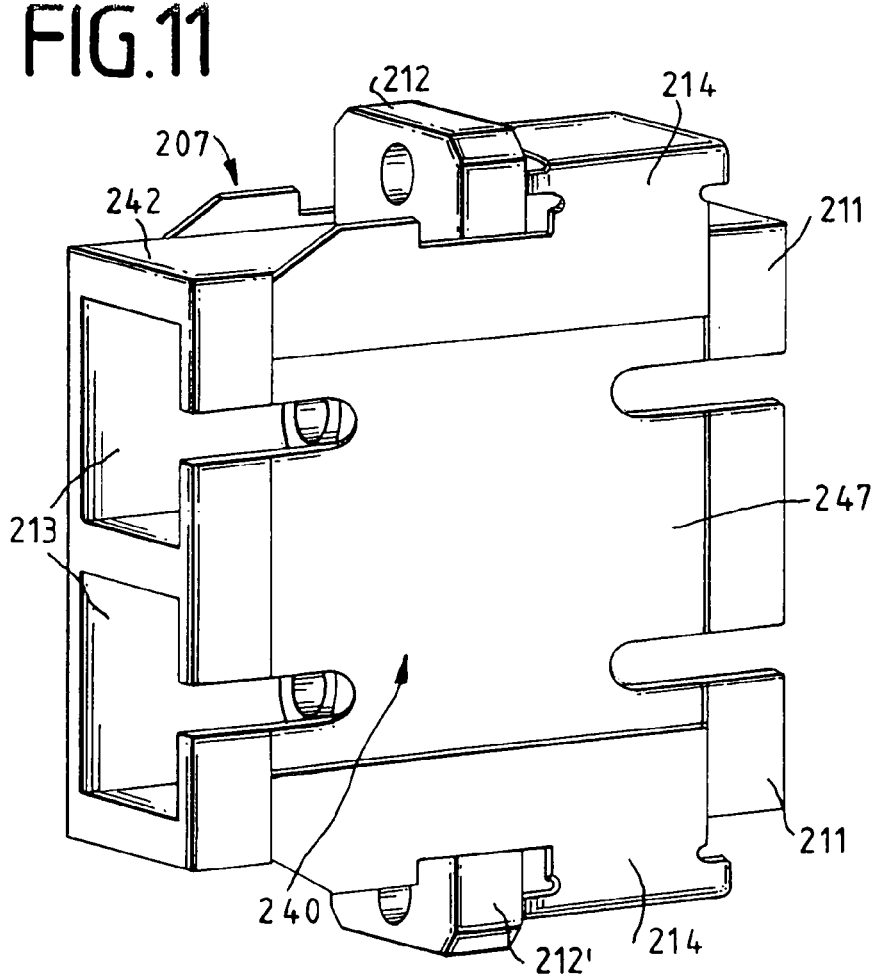
FIG. 11 is a perspective view of a duplex coupling with latching springs as shown in FIGS. 9a, b installed.

In a similar way, FIG. 11 shows the housing of a duplex coupling 207 for in each case two rear plug holders 213 and two front plug holders 211. The side surfaces 240 are likewise formed with steps 247 here, which are located between the plug holders 213, 211 and the flanges 212, 212'.

Figure 12:
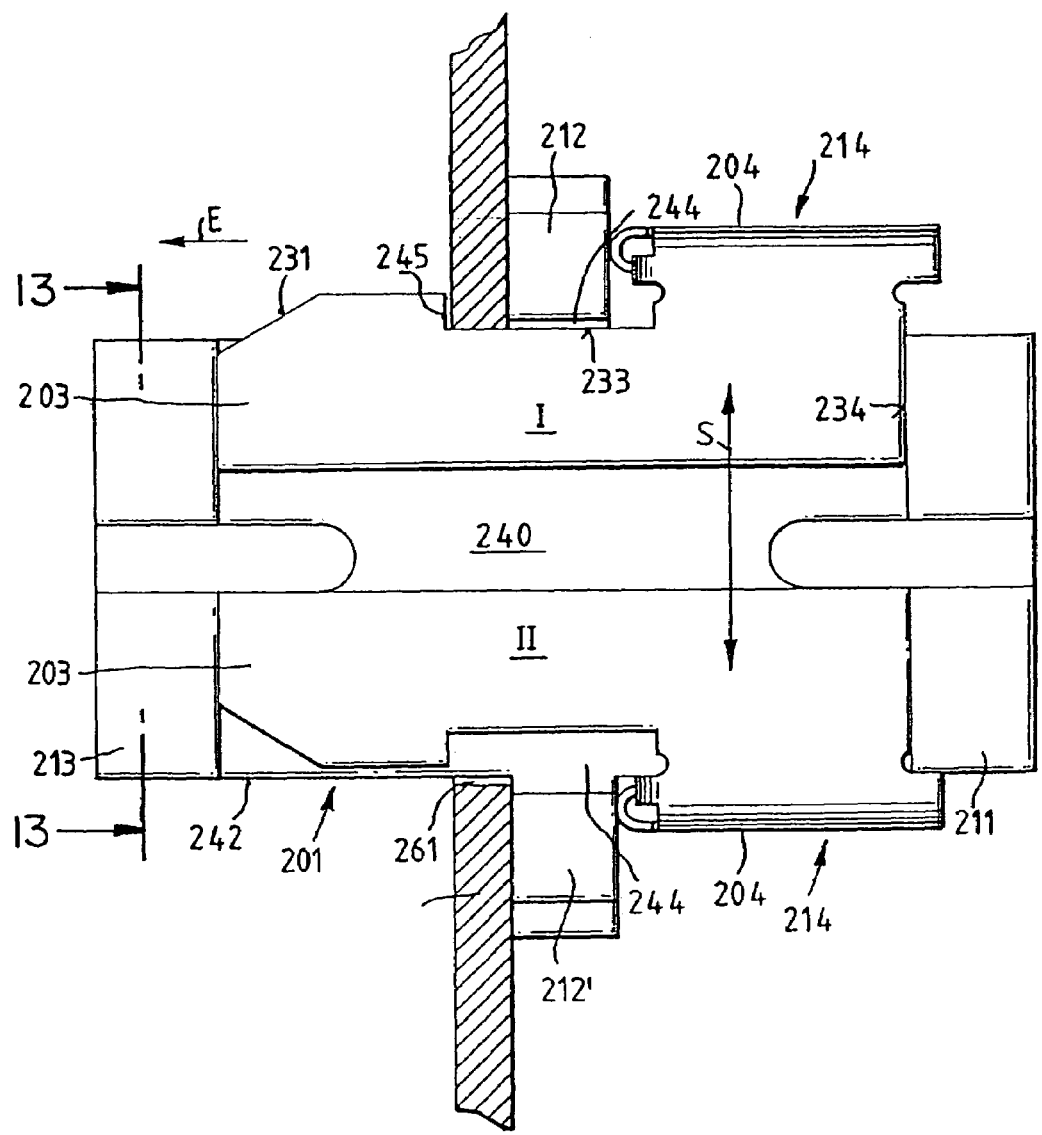
FIG. 12 is a side view, with an illustration of the process for installing a simplex coupling in a front panel.
Figure 13:
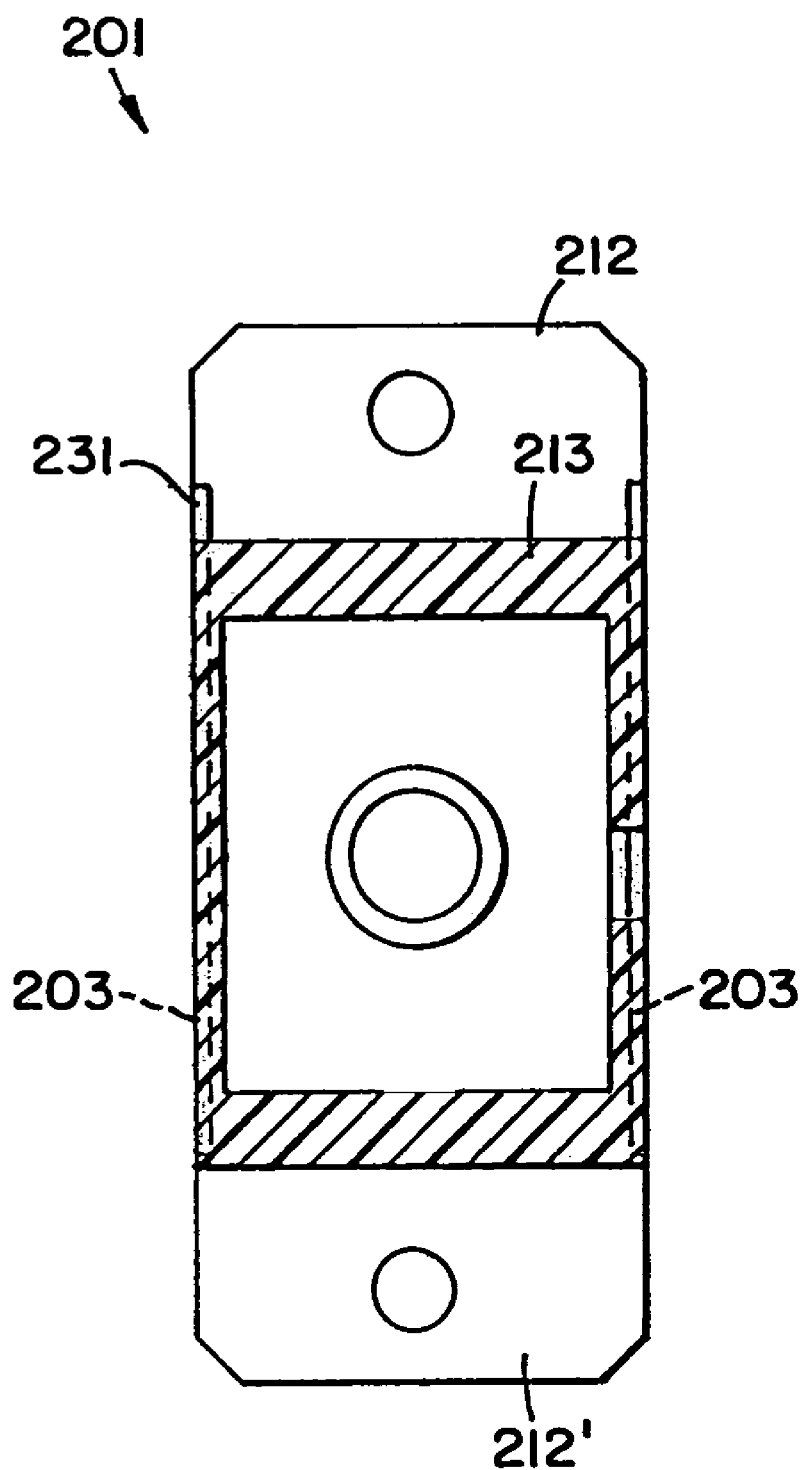
FIG. 13 is a cross-sectional view of the simplex coupling of FIG. 12 taken along the 13—13 line.

FIG. 12 shows a section view of a front panel 202 with a recess 261 and a single rectangle aperture. The two latching springs 214 are shown in the installed position, with the position designation I at the top showing an already locked coupling situation, while the position designation II in the lower half shows a situation in which pressure is still being exerted on the pressure plate 204, so that the latching spring with its side piece 203 on the side surface 240 of the simplex coupling 201 is shifted somewhat against the spreading direction S of the two latching springs 214.

In the illustrated position, the completely assembled simplex coupling has been fitted as shown in FIG. 10, by the two pressure plates 204 first of all being compressed against the spreading direction S and the simplex coupling 201 then being pushed in the insertion direction E through the recess 261 in the front panel 202. It is also possible to install the coupling 201, 207 with the latching spring 204 without compressing the pressure plate 204 into the recess 261 in the front panel 202, if the two latching springs 214 are automatically compressed by means of a chamfer 231, which has an appropriately shaped incline, during insertion into the recess in the front panel 202, and thus pass through the recess. The position I shows how the latching tab 245 engages behind the front panel 202 once the load has been removed from the pressure plate 204, thus producing an interlocked connection for the simplex coupling 201 in the front panel 202. This clearly shows that the side pieces 203 of the latching springs 214 are held securely between the projecting plug holders 213, 211 in the step 244 between the flanges 212, 212'. Thus, for disassembly, pressure can thus be exerted on the pressure plate 204 just by two fingers against the spreading direction S, in order to move the side pieces 203 toward one another, and the simplex coupling 201 can be unlocked again, and can be removed from the front panel 202, and hence from the recess 261 in the front panel.

While specific embodiments of the invention have been shown and described in detail to illustrate the application of the principles of the invention, it will be understood that the invention may be embodied otherwise without departing from such principles.

We claim:

1. A coupling for glass fiber connectors, comprising:
   a housing having two ends which are in the form of first and second plug holders, configured to hold plugs, each plug holder having a cross-section;
   at least one flange projecting from the housing intermediate the first and second plug holders and being suitable for making contact with a front of a panel in order to lock the housing to the panel; and
   at least one latching spring arranged on the housing to shift along a spreading direction from a first position to engage behind the panel to a second position to enable the first plug holder to pass through the panel;
   wherein a first portion of the latching spring extends over at least a part of the first plug holder and a second portion of the latching spring extends over at least a part of the second plug holder, and the first portion of the latching spring is configured to fit within the cross-section of the first plug holder when the latching spring is shifted to the second position, the latching spring having a locking device adjacent the first plug holder, the locking device configured to lock the housing in and release the housing from the panel.

2. The coupling as claimed in claim 1, wherein the latching spring has a spring frame engaging around the second plug holder and from which a spring tab projects with the locking device as a curved spring tongue.

3. The coupling as claimed in claim 1, wherein the latching spring comprises two sides pieces adjacent to two side surfaces of the housing, with spring tabs which are connected by a pressure plate, the pressure plate extending over a third surface of the housing.

4. The coupling as claimed in claim 3, wherein the pressure plate is supported by means of a spring leg on the housing.

5. The coupling as claimed in claim 3, wherein the side pieces have a clasp which can be positioned behind a step on the flange.

6. The coupling as claimed in claim 5, wherein the step covers major parts of each of the side surfaces of the housing between the flange and the plug holders.

7. The coupling as claimed in claim 1, wherein two latching springs on the housing have spring legs which are supported in opposite directions on mutually opposite sides of the housing.

8. The coupling as claimed in claim 1, wherein the housing-is a duplex housing.

9. The coupling as claimed in claim 1, wherein the panel and/or the latching spring is composed of metal, plastic or coated metal.

10. A coupling for glass fiber connectors, the coupling comprising:
 a housing having opposite major surfaces and opposite minor surfaces, the housing configured to mount to a panel from a first side of the panel; and
 an attachment member mounted on the housing, the attachment member including:
  a first planar arm extending adjacent to a first of the major surfaces of the housing, the first planar arm including an engagement portion protruding from the first planar arm in a plane parallel to the first major surface;
  a second planar arm extending adjacent to a second of the major surfaces of the housing, the second planar arm including an engagement portion protruding from the second planar arm in a plane parallel to the second major surface;
  wherein the engagement portion of each arm is configured to engage a panel surface on a second side of the panel when the first and second planar arms are urged in a same direction into a second position and to disengage the panel surface when the first and second planar arms are urged into a first position.

11. The coupling of claim 10, further comprising a second attachment member mounted on the housing.

12. The coupling of claim 10, further comprising a spring configured to apply a force to one of the minor surfaces of the housing to urge the attachment member to the second position.

13. The coupling of claim 12, wherein the attachment member further comprises a pressure plate positioned adjacent the spring, the pressure plate configured to enable application of a force counter to the force of the spring to urge the attachment member into the second position.

14. The coupling of claim 12, wherein the spring is a leaf-spring.

15. The coupling of claim 12, wherein the attachment member further comprises camming surfaces positioned adjacent the engagement portions of the arms, wherein applying a force to the camming surfaces urges the attachment member into the second position against the force of the spring.

16. A coupling for glass fiber connectors, the coupling comprising:
 housing having opposite major surfaces and opposite minor surfaces, each of the opposite major surfaces including a recessed area; and
 an attachment member mounted on the housing, the attachment member including:
  a spring, the spring configured to apply a force to one of the minor surfaces of the housing to urge the attachment member from a first position to a second position; and
  an arm, the arm extending adjacent the recessed area of a first of the major surfaces of the housing to form a common surface with the first major surface, the arm including an engagement portion configured to engage a panel surface when the attachment member is urged into the second position and to disengage the panel surface when the attachment member is urged into the first position.

17. The coupling of claim 16, further comprising a second attachment member mounted on the housing.

18. The coupling of claim 16, wherein the attachment member further comprises a pressure plate configured to enable application of a force counter to the force of the spring to urge the attachment member towards the first position.

19. The coupling of claim 18, wherein the pressure plate is generally parallel to the minor surface.

20. The coupling of claim 16, further comprising a second arm extending adjacent the recessed area of a second of the major surfaces of the housing to form a common surface with the second major surface.

21. The coupling of claim 20, wherein the second arm comprises an engagement portion configured to engage the panel surface when the attachment member is urged into the second position and to disengage the panel surface when the attachment member is urged into the first position.

22. The coupling of claim 16, wherein the arm further comprises a camming surface, wherein application of a force on the camming surface urges the attachment member into the first position.

23. The coupling of claim 16, wherein the spring is a leaf-spring.

24. The coupling of claim 16, wherein the housing includes a first end and a second, opposite end, and wherein the attachment member does not extend over the minor surfaces at the second end of the housing.

* * * * *